US009976550B2

(12) United States Patent
Kimberlin

(10) Patent No.: US 9,976,550 B2
(45) Date of Patent: May 22, 2018

(54) PUMP WITH THERMOSTATIC RELIEF VALVE

(71) Applicant: Standex International Corporation, Salem, NH (US)

(72) Inventor: Robert R. Kimberlin, Murfreesboro, TN (US)

(73) Assignee: Standex International Corporation, Salem, NH (US)

( * ) Notice: Subject to any disclaimer, the term of this patent is extended or adjusted under 35 U.S.C. 154(b) by 202 days.

(21) Appl. No.: 14/995,456

(22) Filed: Jan. 14, 2016

(65) Prior Publication Data

US 2017/0204847 A1 Jul. 20, 2017

(51) Int. Cl.
*F16K 17/38* (2006.01)
*F04B 49/22* (2006.01)

(52) U.S. Cl.
CPC ......... *F04B 49/22* (2013.01); *Y10T 137/7737* (2015.04)

(58) Field of Classification Search
CPC ...... F16K 17/38; F16K 31/002; F16K 17/003; F04B 49/22; Y10T 137/7737; Y10T 137/1797
See application file for complete search history.

(56) References Cited

U.S. PATENT DOCUMENTS

| | | | | |
|---|---|---|---|---|
| 1,694,492 A * | 12/1928 | Tabler | ..................... | F22B 37/42 122/504 |
| 2,740,586 A | 4/1956 | Chaniot | | |
| 2,747,802 A * | 5/1956 | Kmiecik | ............... | F16K 17/003 137/469 |
| 2,810,527 A * | 10/1957 | Work | .................... | F16K 17/003 236/80 R |
| 3,040,764 A * | 6/1962 | Feinberg | ............... | F16K 17/003 137/522 |
| 3,428,251 A * | 2/1969 | Cooper | .................. | G05D 23/08 137/468 |
| 3,654,768 A * | 4/1972 | Inglis | ....................... | F25B 9/04 62/5 |
| 4,089,461 A | 5/1978 | Gocke | | |
| 4,231,342 A * | 11/1980 | Johnston | ................ | F02M 53/00 123/513 |
| 4,744,382 A * | 5/1988 | Visnic | .................. | F16K 17/003 137/68.23 |
| 6,837,688 B2 * | 1/2005 | Kimberlin | ............ | F04C 11/008 417/32 |
| 2003/0041898 A1* | 3/2003 | Dulin | ....................... | E03B 7/12 137/62 |

(Continued)

FOREIGN PATENT DOCUMENTS

WO 2012013231 A1 2/2012

OTHER PUBLICATIONS

International Search Report and Written Opinion for PCT/US2017/013375, dated Apr. 4, 2017, 101 pages.

*Primary Examiner* — Jessica Cahill
(74) *Attorney, Agent, or Firm* — Luedeka Neely Group, P.C.

(57) ABSTRACT

A pressure and thermostatic relief valve for a pump housing is disclosed. The relief valve includes both a pressure relief valve mechanism and a thermostatic or temperature relief valve mechanism. A pump housing incorporating the pressure and thermostatic relief valve is also disclosed.

6 Claims, 4 Drawing Sheets

(56) References Cited

U.S. PATENT DOCUMENTS

| | | | |
|---|---|---|---|
| 2003/0161738 A1* | 8/2003 | Kimberlin | F04C 11/008 |
| | | | 417/307 |
| 2007/0114290 A1 | 5/2007 | Kempf et al. | |
| 2010/0078081 A1 | 4/2010 | McKee | |
| 2013/0062811 A1* | 3/2013 | Kimberlin | B29C 45/2628 |
| | | | 264/299 |
| 2013/0136641 A1 | 5/2013 | Novi et al. | |
| 2014/0021650 A1 | 1/2014 | Kimberlin et al. | |

* cited by examiner

US 9,976,550 B2

PUMP WITH THERMOSTATIC RELIEF VALVE

FIELD

This disclosure relates to the field of fluid pumps. More particularly, this disclosure relates to a pressure and thermostatic relief valve for a pump and to a pump housing incorporating such a relief valve.

BACKGROUND

Positive displacement pumps commonly include a pressure relief device in the event of extreme overpressurization within the pump. Excess pressure may be released through this device, thereby preventing catastrophic valve of the pump. Even in the absence of extreme overpressurization, however, pumps may still be damaged by overheating if the discharge flow is partially or fully blocked. In such case, water or other pumped fluids heat up within the pump and may flash into the vapor phase. In this situation, the pump can be heavily damaged due to thermal expansion of the parts during this overheating.

In order to eliminate, or at least reduce pump damage resulting from such overheating incidents, it would be desirable to provide a pump design in which both pump overheating and pump overpressurization may be separately and independently relieved.

SUMMARY OF THE INVENTION

The above and other needs are met by a pressure and thermostatic relief valve according to the current disclosure. According to one embodiment, the pressure and thermostatic relief valve includes at least the following components: (1) a pressure relief valve housing having a passage for selectively providing flow communication between a pump housing discharge side and a pump housing suction side; (2) a pressure relief actuator positioned at least partially within the passage and movable between a closed position preventing flow communication between the discharge side and the suction side and an open position allowing flow communication between the discharge side and the suction side; and (3) a pressure relief spring for biasing the pressure relief actuator in the closed position until a pressure difference between the discharge side and the suction side exceeds a predetermined amount.

The pressure relief actuator further includes a thermostatic relief valve. This thermostatic relief valve includes at least the following components: (a) a thermostatic relief valve shell having an elongate inner bore, a first opening in communication with the pump housing discharge side and a second opening in communication with the pump housing suction side; (b) a wax thermostatic element disposed within the shell bore; (c) a thermostatic actuator piston movably disposed within the shell bore adjacent the thermostatic element so that expansion of the wax thermostatic element under elevated temperature conditions moves the thermostatic actuator piston from a first position to a second position; (d) a poppet movable between a closed position and an open position and disposed within the shell bore adjacent the thermostatic actuator piston so that movement of the thermostatic actuator piston from the first position to the second position causes the poppet to move from the closed position to the open position, wherein the poppet prevents fluid flow between the first and second shell openings in the closed position and the poppet permits fluid flow between the first and second shell openings in the open position; and (e) a poppet return spring disposed within the shell bore and biased against the poppet for returning the poppet from the open position to the closed position.

In certain embodiments of the relief valve, the thermostatic relief valve preferably also includes a thermostatic actuator return spring disposed within the shell bore and biased against at least a portion of the thermostatic actuator piston for returning the actuator piston from the second position to the first position.

In certain embodiments of the relief valve, the pressure and thermostatic relief valve preferably also includes an adjustment screw for partially compressing the pressure relief spring and thereby varying the bias on the pressure relief actuator.

In another aspect, the present disclosure provides a pump housing. According to one embodiment, the pump housing includes at least a suction side pump housing portion including a fluid inlet port, a discharge side pump housing portion including a fluid outlet port, and a pressure and thermostatic relief valve assembly. In turn, the pressure and thermostatic relief valve assembly includes at least the following components: (1) a pressure relief valve housing having a passage for selectively providing flow communication between a pump housing discharge side and a pump housing suction side; (2) a pressure relief actuator positioned at least partially within the passage and movable between a closed position preventing flow communication between the discharge side and the suction side and an open position allowing flow communication between the discharge side and the suction side; and (3) a pressure relief spring for biasing the pressure relief actuator in the closed position until a pressure difference between the discharge side and the suction side exceeds a predetermined amount.

The pressure relief actuator further includes a thermostatic relief valve. This thermostatic relief valve includes at least the following components: (a) a thermostatic relief valve shell having an elongate inner bore, a first opening in communication with the pump housing discharge side and a second opening in communication with the pump housing suction side; (b) a wax thermostatic element disposed within the shell bore; (c) a thermostatic actuator piston movably disposed within the shell bore adjacent the thermostatic element so that expansion of the wax thermostatic element under elevated temperature conditions moves the thermostatic actuator piston from a first position to a second position; (d) a poppet movable between a closed position and an open position and disposed within the shell bore adjacent the thermostatic actuator piston so that movement of the thermostatic actuator piston from the first position to the second position causes the poppet to move from the closed position to the open position, wherein the poppet prevents fluid flow between the first and second shell openings in the closed position and the poppet permits fluid flow between the first and second shell openings in the open position; and (e) a poppet return spring disposed within the shell bore and biased against the poppet for returning the poppet from the open position to the closed position.

In certain embodiments of the pump housing, the thermostatic relief valve preferably also includes a thermostatic actuator return spring disposed within the shell bore and biased against at least a portion of the thermostatic actuator piston for returning the actuator piston from the second position to the first position.

In certain embodiments of the pump housing, the pressure and thermostatic relief valve preferably also includes an adjustment screw for partially compressing the pressure relief spring and thereby varying the bias on the pressure relief actuator.

In certain embodiments of the pump housing, the suction side pump housing portion and the discharge side pump housing portion each preferably are made from a molded polymer material.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The present disclosure provides a pressure and thermostatic relief valve, and a pump housing incorporating such a relief valve. The pressure and thermostatic relief valve, and the pump housing incorporating the relief valve, are particularly suited for pumping water for use in beverages, such as for pumping water in carbonated water systems, for espresso machines, and beer cooling systems.

Figure 1:
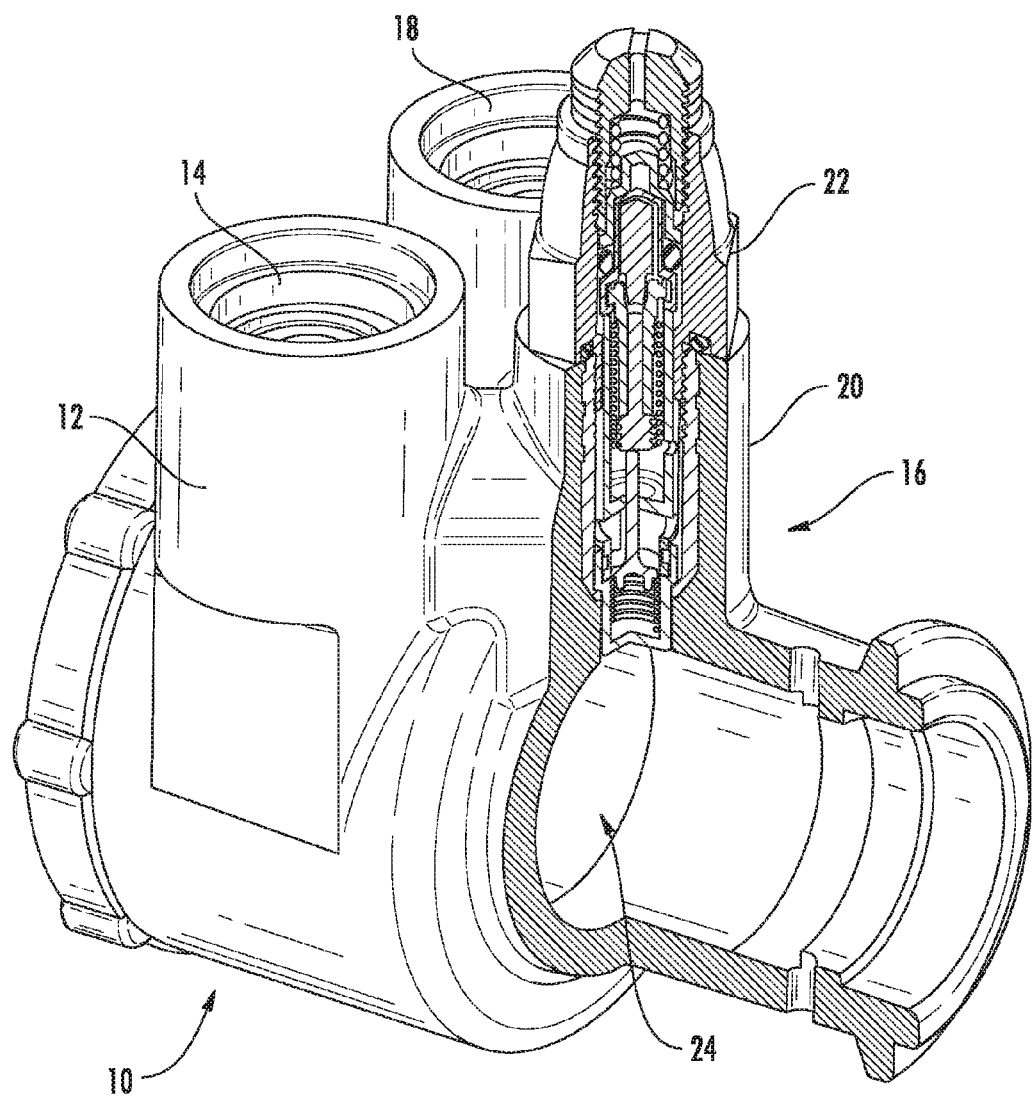
FIG. 1 is a perspective cross-sectional view of a pump housing according to one embodiment of the present disclosure.

As shown in FIG. 1, the pump housing 10 includes at least a suction side pump housing portion 12 including a fluid inlet port 14, a discharge side pump housing portion 16 including a fluid outlet port 18, and a further port 20 for receiving a relief valve assembly 22. The pump housing 10 defines an interior pump cavity 24, with each of the inlet and outlet ports 14, 18 as well as the relief valve assembly 22 being in flow communication with the pump housing cavity 24.

In certain embodiments, the pump housing 10 may be cast or machined from metal, such as brass or stainless steel. Preferably, however, the pump housing is of a one-piece molded plastic construction, and the plastic material may be reinforced with fibers such as glass fibers for added strength and temperature resistance. More preferably, the pump housing is of a one-piece net-shape molded plastic construction.

As used herein, "net-shape molded" means that after the housing is molded it is substantially ready for use and does not require any further significant machining or shaping or polishing, such as the type typically accomplished using computer numerical controlled (CNC) equipment. That is, the terminology "net-shape molded" as used herein will be understood to mean that the housing as molded is substantially ready for use and any additional machining is de minimis and less than about one square inch of the wetted interior surface (i.e., the portion of the interior surface in contact with pumped fluids) is subjected to further machining after being formed by molding.

Accordingly, as the housing as molded preferably does not require further machining, shaping, polishing, or otherwise treatment to be ready to use, the wetted surfaces are not disturbed so as to expose glass fiber to the wetted surface and render the pump unacceptable for food-grade applications. Thus, such pump housings made of glass filled plastics can be made to meet glass fiber limits for food and beverage applications such that the total glass fiber exposure is maintained at or below 1 $in^2$ total exposure. In addition, by avoiding the need for significant further machining or the like, manufacturing costs associated with further treatment are saved.

The pump housing 10 is compatible with a variety of internal pump components which may be installed therein to provide a completed pump. For instance, the completed pump may be configured as a positive displacement vane pump having various moving and static pump parts that cooperate with the pump housing, such as an end cap, endplate, o-rings, bearings, seals, liner, rotor, vanes, alignment pins, snap rings, shaft, inlet and/or outlet port inserts, washers, inlet strainer, and the like. The completed pump may be coupled, as by bolting or clamping or otherwise connecting to a pump motor, such as an integrated or external electric motor, having an output shaft.

Figure 2:
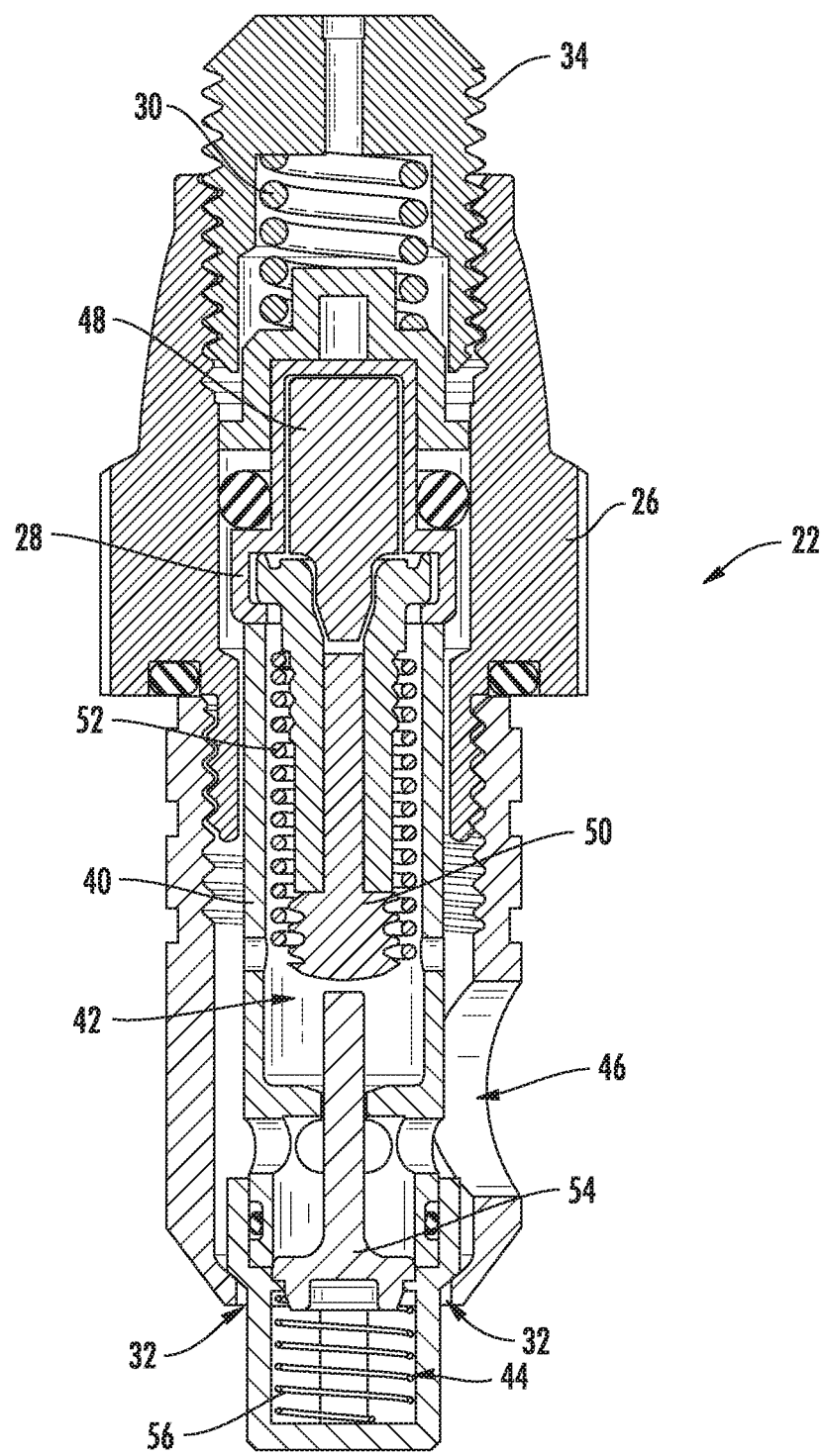
FIG. 2 is an elevation, cross-sectional view of a relief valve according to one embodiment of the present disclosure.
Figure 3:
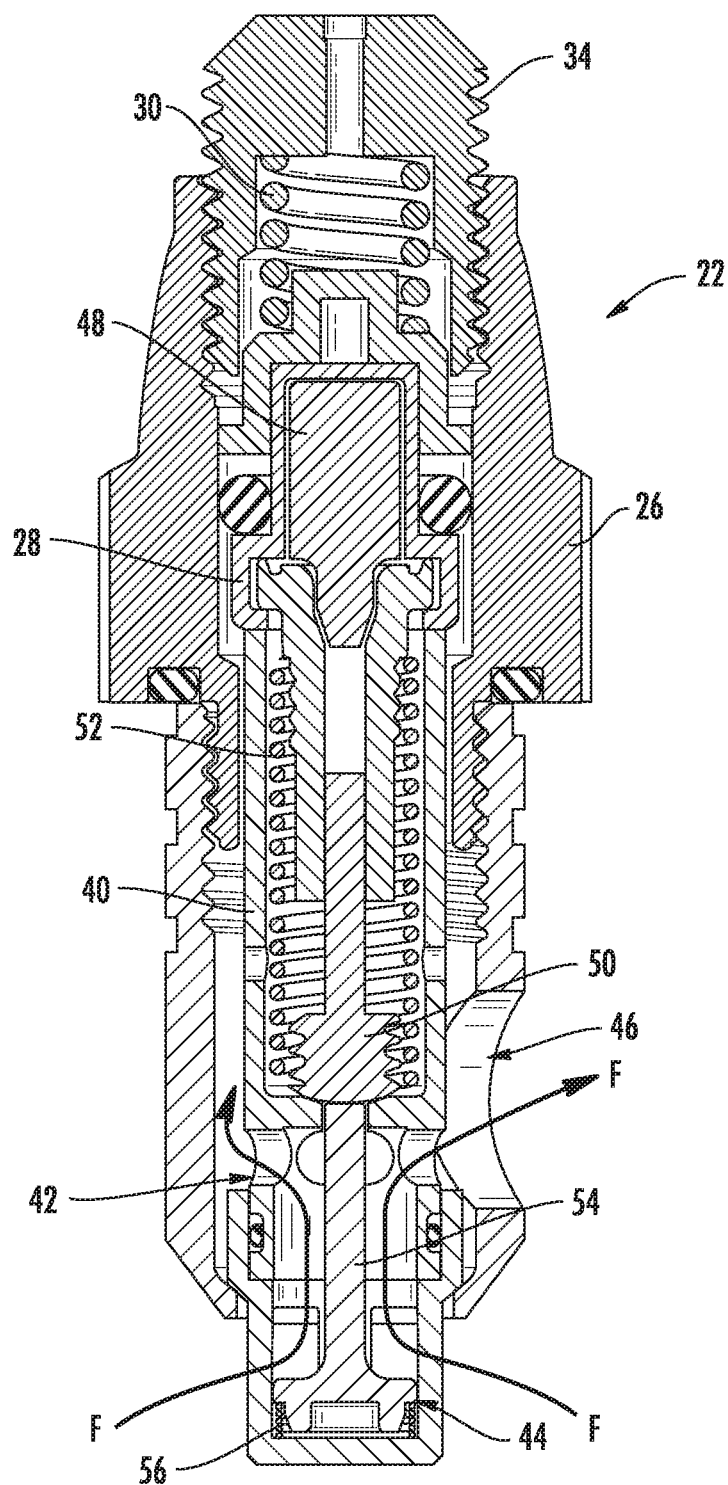
FIG. 3 is an additional elevation, cross-sectional view of a relief valve according to one embodiment of the present disclosure.

According to the present disclosure, a pressure and thermostatic relief valve assembly 22 is inserted into the port 20 of the pump housing 10. As shown in FIGS. 2 & 3, the pressure and thermostatic relief valve assembly 22 includes at least the following components: (1) a pressure relief valve housing 26; (2) a pressure relief actuator 28; and (3) a pressure relief spring 30.

The pressure relief valve housing 26 includes a passage 32 for selectively providing flow communication between a discharge side pump housing portion 16 and a suction side pump housing portion 12. The pressure relief actuator 28 is positioned at least partially within this passage 32. The pressure relief actuator 28 is movable between a closed position preventing flow communication between the discharge side and the suction side and an open position allowing flow communication between the discharge side and the suction side. A pressure relief spring 30 is provided which biases the pressure relief actuator 28 in the closed position until a pressure difference between the discharge side and the suction side exceeds a predetermined amount. In certain embodiments, the pressure and thermostatic relief valve 22 may also include an adjustment screw 34 for partially compressing the pressure relief spring 30 and thereby varying the bias on the pressure relief actuator 28.

According to the present disclosure, the pressure relief actuator 28 further includes a thermostatic relief valve incorporated into the pressure relief actuator 28. With further reference to FIGS. 2 & 3, the thermostatic relief valve includes a thermostatic relief valve shell 40 having an elongate inner bore 42 connecting a first opening 44 and a second opening 46. The first opening 44 is in flow communication with the pump housing discharge side while the second opening 46 is in flow communication with the pump housing suction side.

A thermostatic element 48 is disposed within the shell bore 42. This thermostatic element 48 is preferably made from a wax, or a polymer, and is expandable at elevated temperatures and contracts at reduced temperatures. The material and size of the thermostatic element is generally chosen so that the thermostatic relief valve is actuated at a temperature between about 100° F. to about 150° F., preferably between about 130° F. to about 150° F. In addition, a thermostatic actuator piston 50 is movably disposed within the shell bore adjacent the thermostatic element 48. Expansion of the wax thermostatic element 48 under elevated temperature conditions moves this thermostatic actuator piston 50 from a first position to a second position.

In certain embodiments, the thermostatic relief valve may also include a thermostatic actuator return spring 52 disposed within the shell bore 42 and biased against at least a portion of the thermostatic actuator piston 50 for returning the actuator piston 50 from the second position to the first position.

A poppet 54 is also movably disposed within the shell bore 42, adjacent the thermostatic actuator piston 50. The poppet 54 moves between a closed position and an open position. In the closed position, the poppet 54 prevents fluid flow between the first and second shell openings, while in the open position, the poppet 54 permits fluid flow between the first and second shell openings.

Movement of the poppet 54 is controlled by thermostatic actuator piston 50 and a poppet return spring 56. As expansion of the thermostatic element 48 causes the actuator piston 50 to move from the first position to the second position, the actuator piston 50 in turn causes the poppet 54 to move from the closed position to the open position, as shown in FIG. 3. The poppet return spring 56 is disposed within the shell bore 42 and biased against the poppet 54. When the wax thermostatic element 48 contracts and the actuator piston 50 moves back, the poppet return spring 56 then returns the poppet 54 from the open position to the closed position, as shown in FIG. 2.

Figure 4:
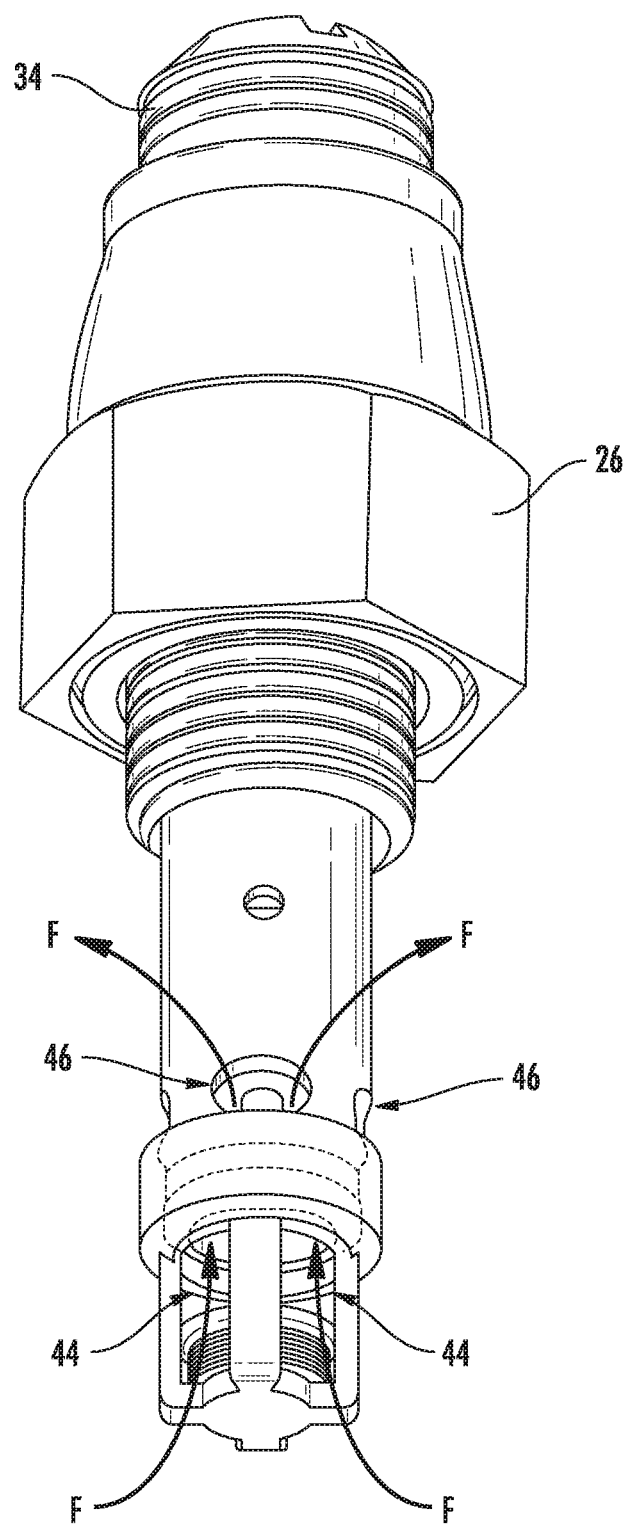
FIG. 4 is a perspective view of a relief valve illustrating fluid flow through the relief valve according to one embodiment of the present disclosure.

When the thermostatic valve is in the open position, water or other pumped fluids may flow from the pump housing discharge side into the first opening 44 of the thermostatic relief valve and out the second opening 46 to the pump housing suction side. The fluid flow paths F are indicated by arrows in FIGS. 3 and 4.

Advantageously then, the present disclosure provides a pump housing and relief system wherein pump overpressurization and pump overheating may each be relieved separately and independently from one another.

In particular, in the case of overheating of pumped fluid due to a partial or complete blockage of flow downstream of the pump, a portion of the blocked discharge flow may be relieved through the thermostatic relief valve—even if the pressure within the pump is insufficient to open the pressure relief valve. Thus substantial damage to the pump due to thermal expansion of overheated parts may be prevented in this circumstance.

Positive displacement pumps commonly include a pressure relief device in the event of extreme overpressurization within the pump. Excess pressure may be released through this device, thereby preventing catastrophic valve of the pump. Even in the absence of extreme overpressurization, however, pumps may still be damaged by overheating if the discharge flow is partially or fully blocked. In such case, water or other pumped fluids heat up within the pump and may flash into the vapor phase. In this situation, the pump can be heavily damaged due to thermal expansion of the parts during this overheating.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A pressure and thermostatic relief valve comprising:
   a pressure relief valve housing having a passage for selectively providing flow communication between a pump housing discharge side and a pump housing suction side;
   a pressure relief actuator positioned at least partially within the passage and movable between a closed position preventing flow communication between the discharge side and the suction side and an open position allowing flow communication between the discharge side and the suction side; and
   a pressure relief spring for biasing the pressure relief actuator in the closed position until a pressure difference between the discharge side and the suction side exceeds a predetermined amount;
   wherein the pressure relief actuator further includes a thermostatic relief valve, the thermostatic relief valve comprising
   a thermostatic relief valve shell having an elongate inner bore, a first opening in communication with the pump housing discharge side and a second opening in communication with the pump housing suction side;
   a wax thermostatic element disposed within the shell bore;
   a thermostatic actuator piston movably disposed within the shell bore adjacent the thermostatic element so that expansion of the wax thermostatic element under elevated temperature conditions moves the thermostatic actuator piston from a first position to a second position;
   a poppet movable between a closed position and an open position and disposed within the shell bore adjacent the thermostatic actuator piston so that movement of the thermostatic actuator piston from the first position to the second position causes the poppet to move from the closed position to the open position, wherein the poppet prevents fluid flow between the first and second shell openings in the closed position and the poppet permits fluid flow between the first and second shell openings in the open position;
   a poppet return spring disposed within the shell bore and biased against the poppet for returning the poppet from the open position to the closed position; and
   a thermostatic actuator return spring disposed within the shell bore and biased against at least a portion of the thermostatic actuator piston for returning the actuator piston from the second position to the first position.

2. The pressure and thermostatic relief valve of claim 1, further comprising an adjustment screw for partially compressing the pressure relief spring and thereby varying the bias on the pressure relief actuator.

3. A pump housing comprising:
   a suction side pump housing portion including a fluid inlet port,
   a discharge side pump housing portion including a fluid outlet port, and a pressure and thermostatic relief valve assembly,
wherein the pressure and thermostatic relief valve assembly comprises
a pressure relief valve housing having a passage for selectively providing flow communication between a pump housing discharge side and a pump housing suction side;
a pressure relief actuator positioned at least partially within the passage and movable between a closed position preventing flow communication between the discharge side and the suction side and an open position allowing flow communication between the discharge side and the suction side; and
a pressure relief spring for biasing the pressure relief actuator in the closed position until a pressure difference between the discharge side and the suction side exceeds a predetermined amount;
wherein the pressure relief actuator further includes a thermostatic relief valve, the thermostatic relief valve comprising
a thermostatic relief valve shell having an elongate inner bore, a first opening in communication with the pump housing discharge side and a second opening in communication with the pump housing suction side;
a wax thermostatic element disposed within the shell bore;
a thermostatic actuator piston movably disposed within the shell bore adjacent the thermostatic element so that expansion of the wax thermostatic element under elevated temperature conditions moves the thermostatic actuator piston from a first position to a second position;
a poppet movable between a closed position and an open position and disposed within the shell bore adjacent the thermostatic actuator piston so that movement of the thermostatic actuator piston from the first position to the second position causes the poppet to move from the closed position to the open position, wherein the poppet prevents fluid flow between the first and second shell openings in the closed position and the poppet permits fluid flow between the first and second shell openings in the open position;
a poppet return spring disposed within the shell bore and biased against the poppet for returning the poppet from the open position to the closed position; and
a thermostatic actuator return spring disposed within the shell bore and biased against at least a portion of the thermostatic actuator piston for returning the actuator piston from the second position to the first position.

4. The pump housing of claim 3, further comprising an adjustment screw for partially compressing the pressure relief spring and thereby varying the bias on the pressure relief actuator.

5. The pump housing of claim 3, wherein the suction side pump housing portion and the discharge side pump housing portion each comprise a molded polymer material.

6. The pump housing of claim 3, wherein the suction side pump housing portion and the discharge side pump housing portion each comprise a fiber-reinforced molded polymer material.

\* \* \* \* \*